(12) United States Patent
Mizes et al.

(10) Patent No.: US 10,026,004 B2
(45) Date of Patent: Jul. 17, 2018

(54) SHADOW DETECTION AND REMOVAL IN LICENSE PLATE IMAGES

(71) Applicant: Xerox Corporation, Norwalk, CT (US)

(72) Inventors: Howard Mizes, Pittsford, NY (US); Vladimir Kozitsky, Rochester, NY (US)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 129 days.

(21) Appl. No.: 15/205,146

(22) Filed: Jul. 8, 2016

(65) Prior Publication Data

US 2018/0012101 A1    Jan. 11, 2018

(51) Int. Cl.
G06K 9/34 (2006.01)
G06T 5/00 (2006.01)
G06K 9/00 (2006.01)
G06T 7/00 (2017.01)

(52) U.S. Cl.
CPC ......... *G06K 9/346* (2013.01); *G06K 9/00771* (2013.01); *G06T 5/008* (2013.01); *G06T 7/0002* (2013.01); *G06K 2209/01* (2013.01); *G06K 2209/15* (2013.01); *G06T 2207/20104* (2013.01)

(58) Field of Classification Search
CPC ........... G06K 2209/15; G06K 9/00771; G06K 9/346; G06T 5/008; G06T 7/0002
See application file for complete search history.

(56) References Cited

U.S. PATENT DOCUMENTS

| 5,912,992 A * | 6/1999 | Sawada ............... G06K 9/38 358/461 |
| 8,644,561 B2 | 2/2014 | Burry et al. |
| 8,792,682 B2 | 7/2014 | Fan et al. |
| 8,934,676 B2 | 1/2015 | Burry et al. |
| 9,082,037 B2 | 7/2015 | Burry et al. |
| 9,213,910 B2 | 12/2015 | Burry et al. |

OTHER PUBLICATIONS

Krishna Kant Singh; Kirat Pal; and M.J. Nigam; "Shadow Detection and Removal from Remote Sensing Images Using NDI and Morphological Operators", Mar. 2012, International Journal of Computer Applications (0975-8887), vol. 42, pp. 37-40.*
Al-Najdawi, N. et al., "A survey of cast shadow detection algorithms," Pattern Recognition Letters (2012) 33:752-764.
Otsu, N., "A Threshold Selection Method from Gray-Level Histograms," IEEE Transactions on Systems, Man, and Cybernetics (1979) 9(1):62-66.

(Continued)

*Primary Examiner* — Siamak Harandi
(74) *Attorney, Agent, or Firm* — Kevin Soules; Kermit D. Lopez; Luis M. Ortiz

(57) ABSTRACT

A method, system, and apparatus for license plate relighting comprises collecting an image of a license plate, performing license plate recognition on the image of the license plate; calculating a confidence metric for the license plate recognition; and performing a shadow detection and relighting method if the confidence metric is below a predetermined threshold, comprising identifying a shaded region of said license plate, determining if the shaded region is actually shaded, and relighting the actually shaded region.

20 Claims, 11 Drawing Sheets

(56) References Cited

OTHER PUBLICATIONS

Singh, K. K. et al., "Shadow Detection and Removal from Remote Sensing Images Using NDI and Morphological Operators," International Journal of Computer Applications (2012) 42(10):37-40.
Wen, Y. et al., "An Algorithm for License Plate Recognition Applied to Intelligent Transportation System," IEEE Transactions on Intelligent Transportation Systems (2011) 12(3):830-845.

* cited by examiner

SHADOW DETECTION AND REMOVAL IN LICENSE PLATE IMAGES

TECHNICAL FIELD

Embodiments are generally related to the field of imaging. Embodiments are also related to the field of cameras and data capture. Embodiments are additionally related to the field of optical character recognition. Embodiments are also related to the field of license plate recognition. Embodiments are further related to methods and systems for detecting and removing shadows in license plate images.

BACKGROUND

Automatic license plate recognition is important for the management of vehicle flow in an intelligent traffic infrastructure. Historically, tolling has occurred at tollbooths where immediate payment would occur as vehicles proceeded down the lane past the booths. As automated payment methods and vehicle identification methods become available, these booths are removed and the lanes are converted to electronic tolling, also known as open road tolling (ORT).

In standard tollbooth based tolling scenarios, images of vehicle license plates are taken under controlled conditions. The tollbooth is typically covered and well illuminated which enables acquisition of uniformly illuminated plate images. However, as the adoption of electronic tolling has become more widespread, the need for cars to slow down to pass through a tollbooth is seen as an unnecessary impediment to the free flow of traffic. Therefore, there continues to be a conversion to open road tolling. In open road tolling, the cars are generally monitored by cameras attached to a gantry above the highway where the traffic flows past at full speed.

As a result, for open road tolling, conditions under which images of cars are collected are less controlled. One of the challenges is the appearance of shadows cast onto the plates. For many vehicles, the plates are recessed behind a structure on the bumper that contains lights to illuminate the plate during darkness. Depending on the angle of the sun, during the day a shadow may be cast onto the license plate from the vehicle structure and/or the gantry. This leads to an image where a part of the plate is considerably darker than the rest.

For some plate recognition algorithms, partial shading of license plates leads to poor recognition performance. Typically a binarization step is used as preprocessing in optical character recognition algorithms. After binarization, the shaded area may be identified as part of the character. Alternatively, the character regions of the unshaded areas may be washed out and be chosen as the background.

The primary need that has driven shadow detection in other video based applications is tasks such as object detection, segmentation, and tracking. In such cases the shadows move along with the object across multiple frames and tend to be identified as part of the foreground. The vision algorithms for object detection and tracking have been primarily developed for natural scenes and require temporal information from multiple frames.

By contrast, the detection of shadows cast on a license plate or on text has received basically no attention. The applications are indeed limited because the application is specifically for optical character recognition (OCR). In many cases, OCR on printed documents is performed on images captured under controlled conditions where shadows would not be present.

There is, therefore, a need for effective shadow detection and elimination for application in license plate detection and OCR applications as described herein.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for video collection.

It is another aspect of the disclosed embodiments to provide a method and system for shadow detection.

It is another aspect of the disclosed embodiments to provide a method and system for shadow detection and correction.

It is yet another aspect of the disclosed embodiments to provide an enhanced method and system for detecting shadows on license plates and correcting for such shadows in order to facilitate character recognition.

The aforementioned aspects and other objectives and advantages can now be achieved as described herein. A method, system, and apparatus for license plate recognition comprises collecting an image of a license plate; performing license plate recognition on the image of the license plate; calculating a confidence metric for the license plate recognition; and performing a shadow detection and relighting if the confidence metric is below a predetermined threshold. The shadow detection and relighting can comprise identifying a shaded region of the license plate, determining if the shaded region is actually shaded, and relighting the actually shaded region.

Identifying a shaded region of the license plate further comprises fitting a tight bound box around the license plate in the image of the license plate, converting the image of the license plate to black and white, removing structures from the image of the license plate, binarizing the image of the license plate, identifying edges in the image of the license plate, selecting a longest edge from the identified edges in the image of the license plate as an edge defining a boundary between the shaded region of the license plate and an unshaded region of the license plate, and smoothing the selected longest edge from the identified edges in the image of the license plate.

Determining if the shaded region is actually shaded can further comprise extracting at least two features from the image of the license plate, combining the features to form a shadow classifier, and applying the shadow classifier to the image of the license plate in order to determine if a shadow is present in the image of the license plate.

Relighting the actually shaded region can further comprise creating a shadow mask and applying a relighting application to the shadow masked region.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood, at least in part, from usage in context. For example, terms, such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
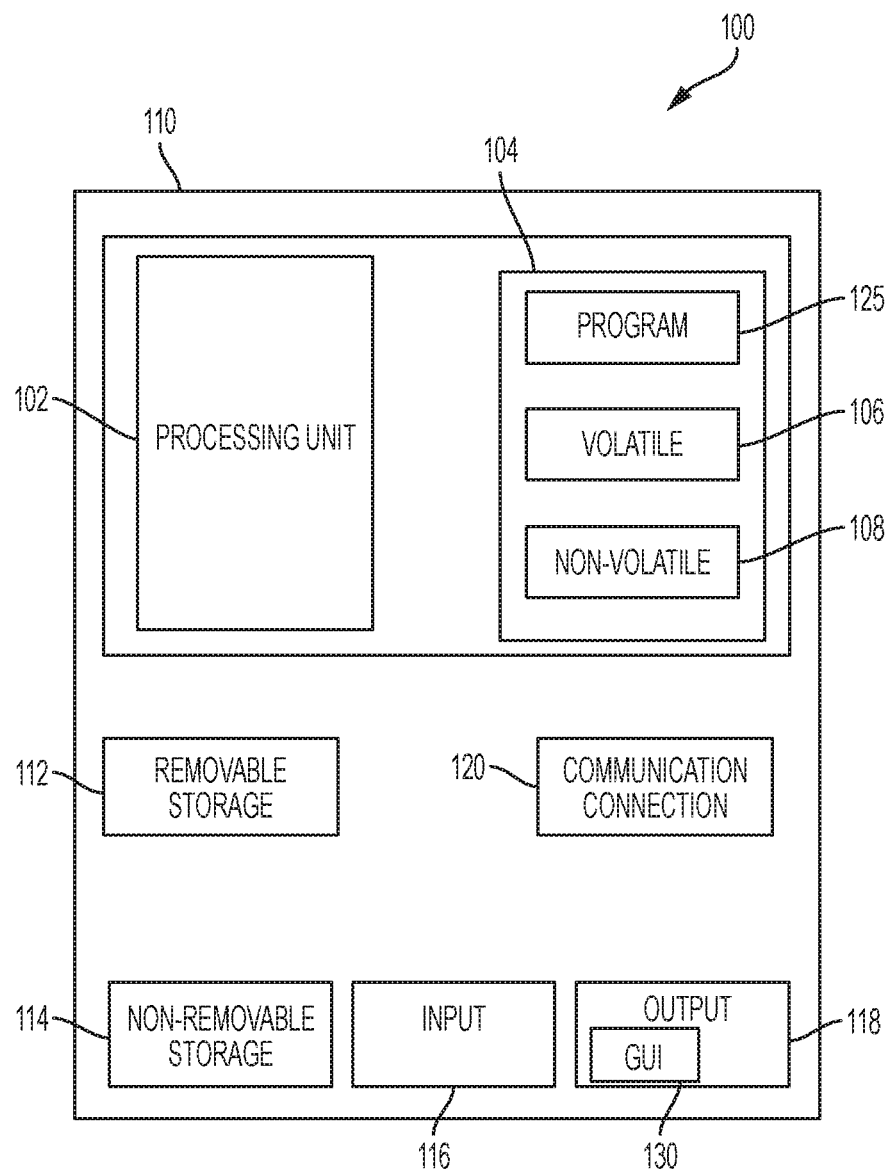
FIG. 1 depicts a block diagram of a computer system which is implemented in accordance with the disclosed embodiments.
Figure 2:
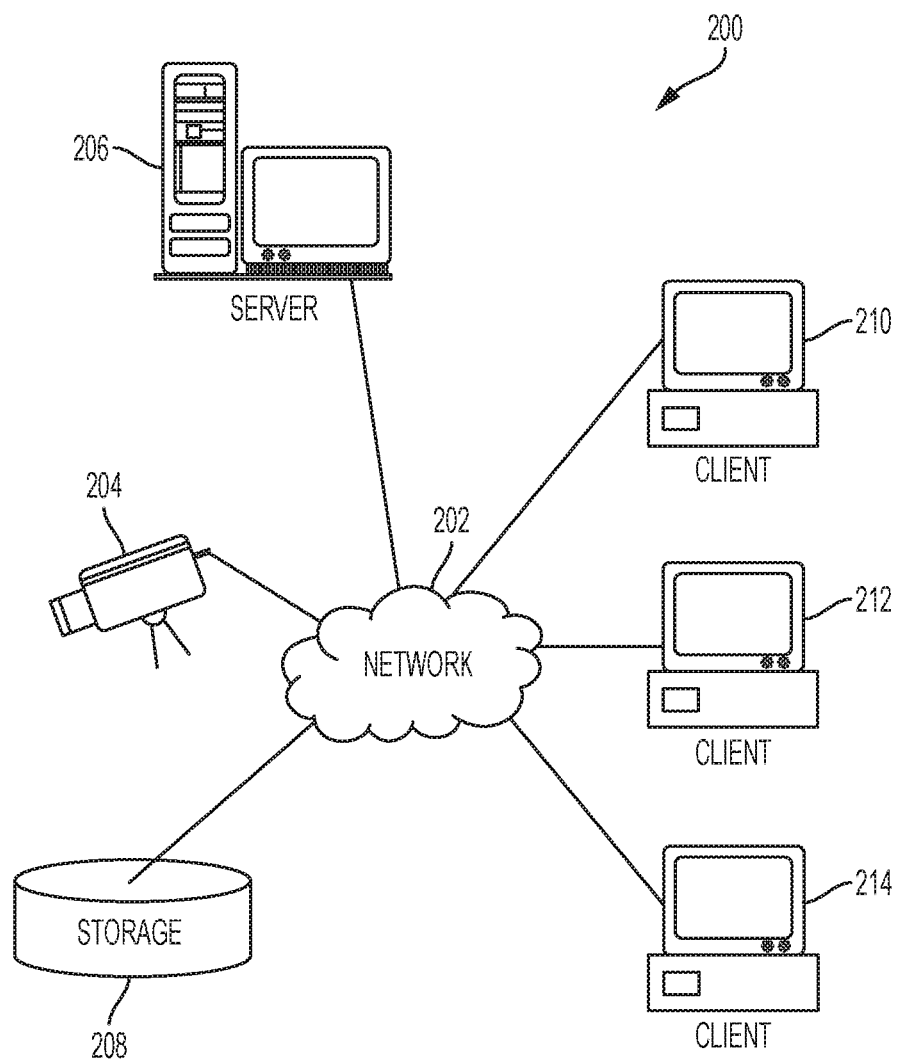
FIG. 2 depicts a graphical representation of a network of data-processing devices in which aspects of the present embodiments may be implemented.
Figure 3:
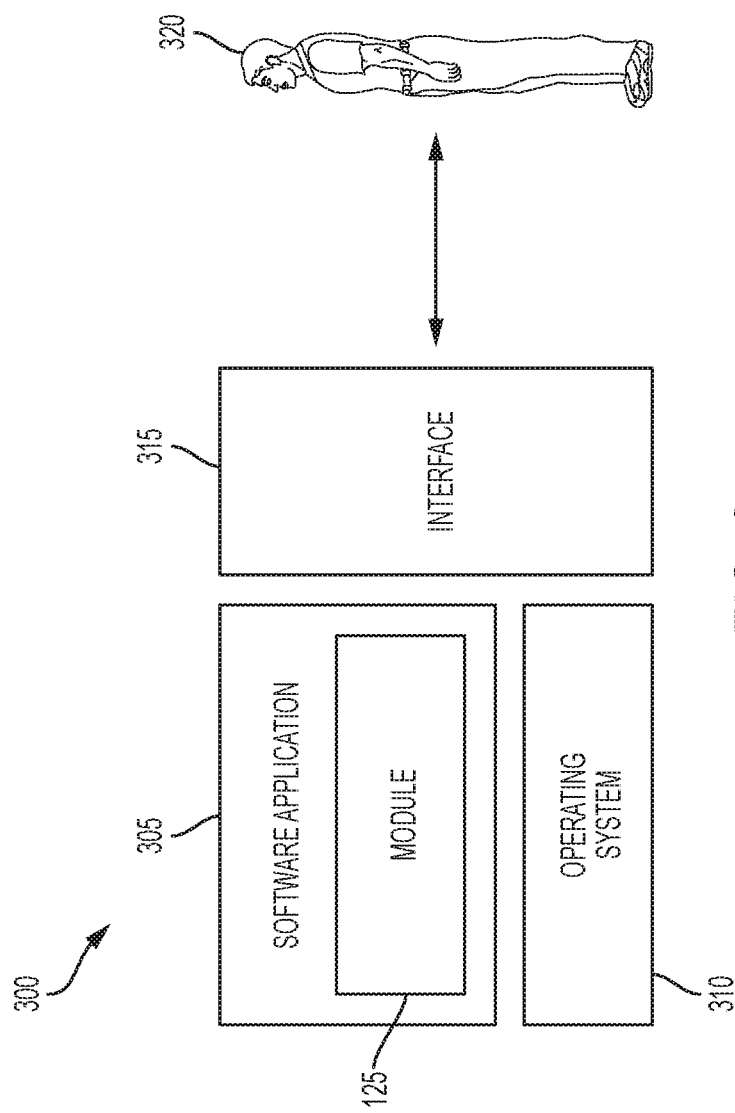
FIG. 3 depicts a computer software system for directing the operation of the data-processing system depicted in FIG. 1, in accordance with an example embodiment.

FIGS. 1-3 are provided as exemplary diagrams of data-processing environments in which embodiments may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing the methods and systems disclosed herein is shown in FIG. 1. A general computing device in the form of a computer 110 may include a processing unit 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data, including data comprising frames of video.

Computer 110 may include or have access to a computing environment that includes input 116, output 118, and a communication connection 120. The computer may operate in a networked environment using a communication connection to connect to one or more remote computers or devices. The remote computer may include a personal computer (PC), server, router, network PC, a peer device or other common network node, or the like. The remote device may include a sensor, photographic camera, video camera, tracking device, or the like. The communication connection may include a Local Area Network (LAN), a Wide Area Network (WAN), or other networks. This functionality is described in more fully in the description associated with FIG. 2 below.

Output 118 is most commonly provided as a computer monitor, but may include any computer output device. Output 118 may also include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module 125, which can be representative of other modules described herein, are stored on a computer-readable medium and are executable by the processing unit 102 of computer 110. Program module 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present embodiments may be implemented. Network data-processing system 200 is a network of computers in which embodiments may be implemented. Note that the system 200 can be implemented in the context of a software module such as program module 125. The system 200 includes a network 202 in communication with one or more clients 210, 212, and 214. Network 202 is a medium that can be used to provide communications links between various devices and computers connected together within a networked data processing system such as computer system 100. Network 202 may include connections such as wired communication links, wireless communication links, or fiber optic cables. Network 202 can further communicate with one or more servers 206, one or more external devices such as video camera 204, and a memory storage unit such as, for example, memory or database 208.

In the depicted example, video camera 204 and server 206 connect to network 202 along with storage unit 208. In addition, clients 210, 212, and 214 connect to network 202. These clients 210, 212, and 214 may be, for example, personal computers or network computers. Computer system 100 depicted in FIG. 1 can be, for example, a client such as client 210, 212, and/or 214. Alternatively, clients 210, 212, and 214 may also be, for example, a photographic camera, a video camera, a tracking device, a sensor, etc.

Computer system 100 can also be implemented as a server such as server 206, depending upon design considerations. In the depicted example, server 206 provides data such as boot files, operating system images, applications, and application updates to clients 210, 212, and 214, and/or to video camera 204. Clients 210, 212, and 214 and video camera 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments.

FIG. 3 illustrates a computer software system 300, which may be employed for directing the operation of the data-processing systems such as computer system 100 depicted in FIG. 1. Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) 125, may be "loaded" (i.e., transferred from removable storage 112 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments, which can be embodied in the context of a data-processing system such as computer system 100, in conjunction with program module 125, and data-processing system 200 and network 202 depicted in FIGS. 1-2. The present embodiments, however, are not limited to any particular application or any particular environment. Instead, those skilled in the art will find that the systems and methods may be advantageously applied to a variety of system and application software including database management systems, word processors, and the like. Moreover, the present invention may be embodied on a variety of different platforms including Macintosh, UNIX, LINUX, and the like. Therefore, the descriptions of the exemplary embodiments, which follow, are for purposes of illustration and not considered a limitation.

Figure 4:
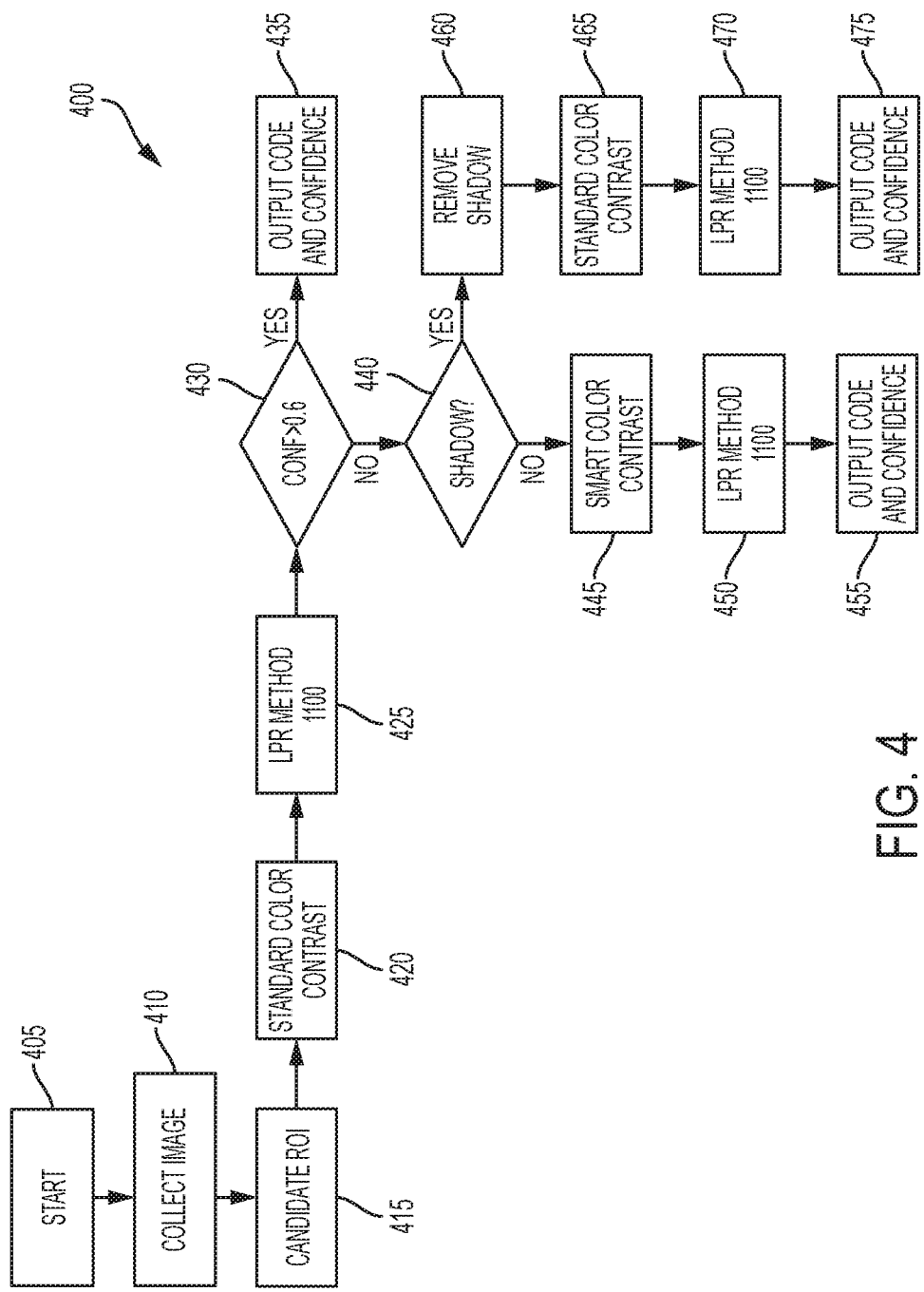
FIG. 4 depicts a flow chart illustrating logical operational steps associated with a method for license plate recognition in accordance with the disclosed embodiments.

FIG. 4 illustrates an exemplary method 400 for automatic license plate recognition. The method begins at step 405. At step 410, an image of the front or rear of a vehicle, which includes a region containing the license plate, can be collected. The image may be collected with a video camera 204, surveillance camera, or other such camera. The image collection may take place at a tolling area, in an open road tolling scenario, or in another such scenario.

Figure 11:
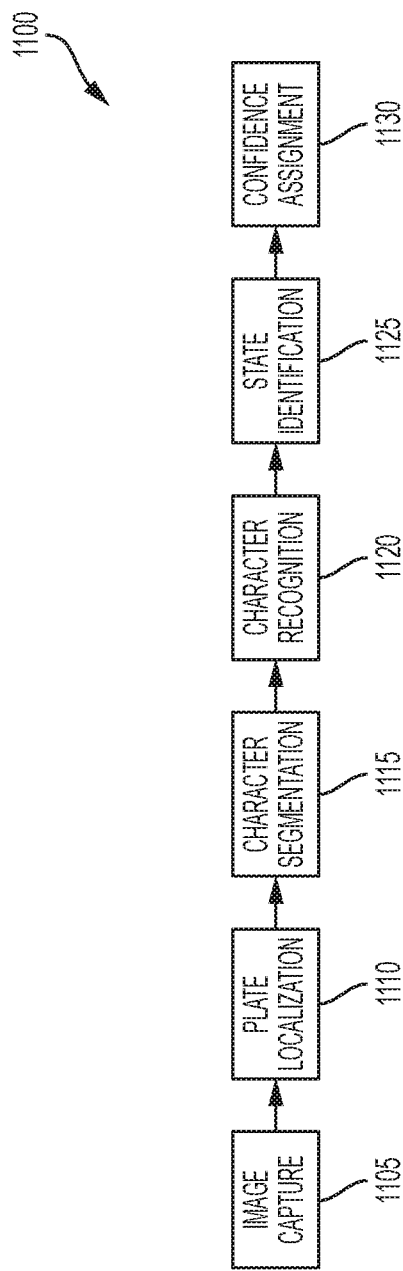
FIG. 11 depicts a flow chart illustrating logical operational steps associated with a method for license plate recognition in accordance with disclosed embodiments.

A candidate region of interest (ROI) image containing the license plate is identified at step 415. The candidate ROI image is identified by processing the image so that features characteristic of a license plate such as letters of the expected dimensions are emphasized in a set of image processing steps. This candidate image is produced by the localization subsystem of the LPR engine (Step 1110 of FIG. 11). In some embodiments, images are collected with RGB colors. In step 420, a conversion of a three channel image is converted to a single channel image by performing a linear combination of the content of each pixel independent of the content of the image which is called standard color contrast. The ROI image is passed through the standard license plate recognition (LPR) workflow 425 and a confidence score relating to the license plate recognition and the license plate code can be produced. In some cases, such license plate recognition can include proprietary license plate recognition methods such as Xerox's XLPR. FIG. 11 illustrates a more detailed accounting of the steps associated with XLPR, but any equivalent license plate recognition method might alternatively be implemented at this stage.

For example, FIG. 11 shows a standard process flow 1100 for an LPR method. As shown in FIG. 11, various functions of an LPR engine are applied in a serial manner. Such steps include image capture at step 1105, license plate region identification at step 1110, segmentation of characters for a candidate license plate region at step 1115, application of OCR to the segmented (or unsegmented) characters at step 1120, determination of jurisdiction at step 1125, and determination of the license plate code/assignment of confidence to the results at step 1130. Some or all of these steps may be implemented in the method 400 illustrated in FIG. 4, in particular at step 425.

Shadow detection and relighting methods and systems can be incorporated into the standard LPR workflow 1100. The confidence of a correct OCR code is compared against a threshold at step 430, and if the threshold is met, the results are returned at step 435 to be used downstream as part of a business workflow. Such a business workflow might include a tolling or ticketing application. In an embodiment, the threshold is set such that the LPR results have a desired accuracy. In some embodiments, the desired accuracy may be 99%.

If the confidence is below the desired threshold (in the case of desired accuracy set at 99%, an acceptable threshold might be 0.6), then the image is processed according to step 440 to determine if there is a shadow present in the image. If a shadow is present, then the shadow is removed and the image is relit at step 460. Standard color contrast can be performed at step 465 and the LPR method 1110 can be rerun at step 470. A code and confidence is output at step 475 based on the relit image.

On the other hand, if a shadow is not present, there is an opportunity to improve performance using a smart color contrast procedure at step 445. A smart color contrast procedure uses image processing algorithms to identify the foreground color which consists of the letters of the plate. A conversion from a three channel RGB image to a monochrome image is chosen to best maximize the contrast between the letters and the rest of the plate. A color image is converted to black and white using this smart color contrast procedure, which identifies the color of the character and performs an RGB to gray conversion which gives the highest contrast image. OCR is performed on the resulting image at step 450 according to method 1100 and an output code and confidence is generated at step 455.

Figure 5:
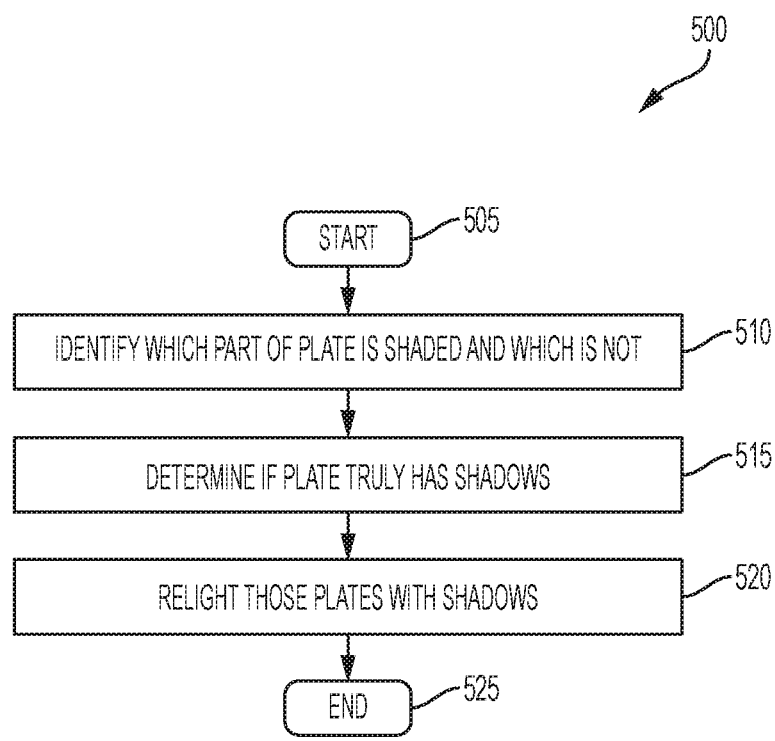
FIG. 5 depicts a flow chart illustrating logical operational steps associated with a method for shadow detection and relighting in accordance with disclosed embodiments.

In an embodiment, the steps 440 and 460 can be embodied as a plurality of sub-steps illustrated in FIG. 5. Assuming that the ALPR system has provided a confidence metric below a predefined threshold, the basic method 500, illustrated in FIG. 5, begins at step 505.

First, each plate can be evaluated to identify which part of the plate is shaded and which part of the plate is not shaded at step 510. Shadow detection as illustrated in step 440 consists primarily of finding the boundary between the shaded area of a license plate and the unshaded area. However, because not all the plates have a shadow, the embodiments must necessarily include a mechanism for determining whether or not a shadow is actually present. Thus at step 515, a determination of whether the plate truly includes a shadow can be performed based on features extracted from the shadow detection algorithm.

Finally, at step 520, relighting is applied to the plate to increase the luminescence of the shaded region to make the plate more uniformly lit. The shadow relighting portion comprises changing the brightness of the shadow region so that it appears to match the part of the plate that is not covered by a shadow. It is important to note that the relighting is intended to improve the LPR process not to address the image quality for other aesthetic reasons. The method ends at step 525.

Figure 6:
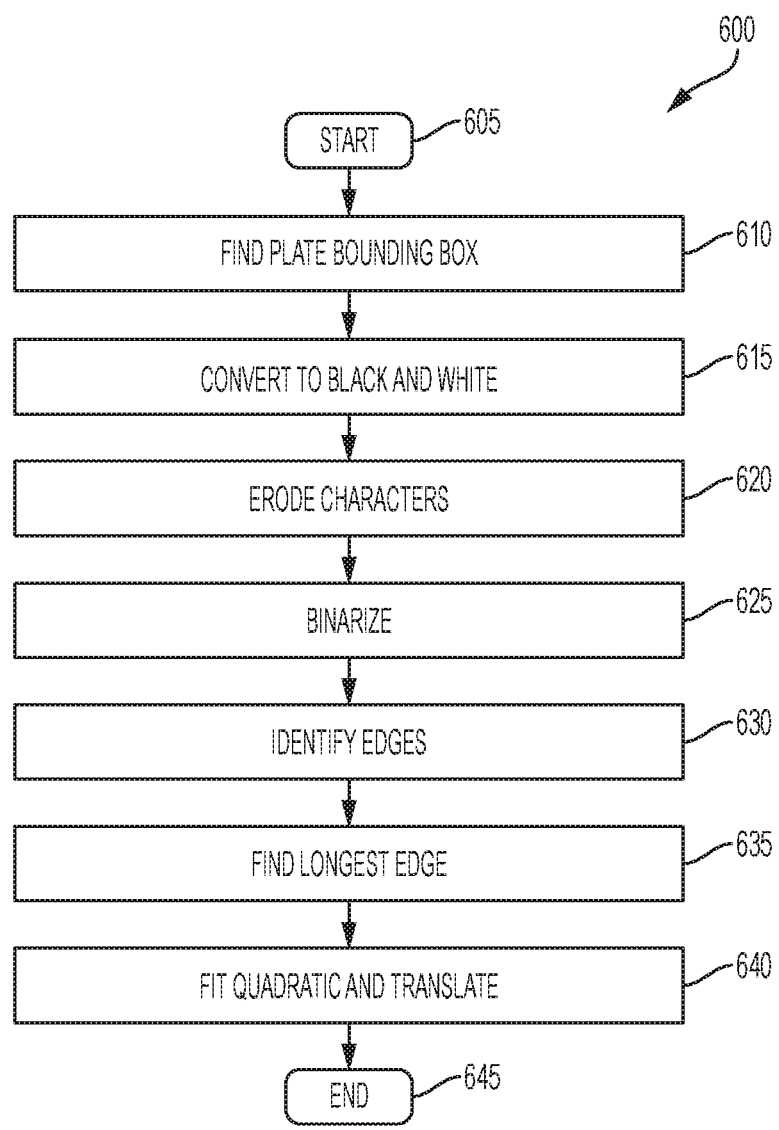
FIG. 6 depicts a flow chart illustrating logical operational steps associated with a method for identifying the shaded region of a license plate in accordance with aspects of the disclosed embodiments.
Figure 7:
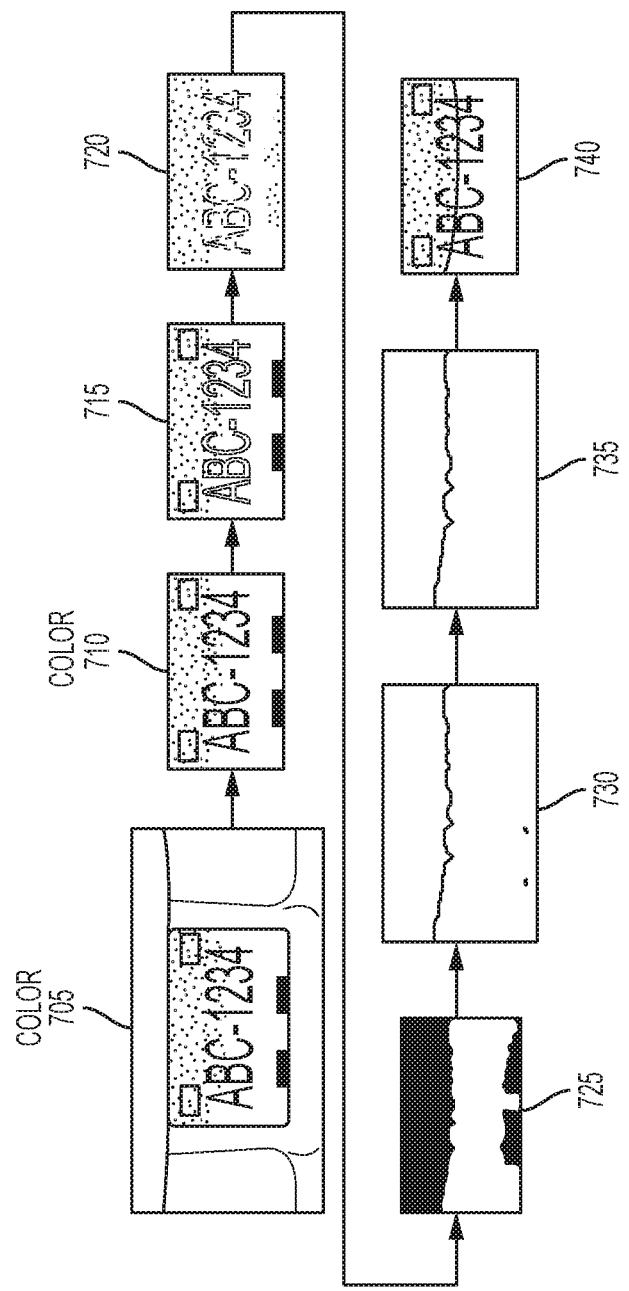
FIG. 7 depicts an exemplary implementation of the method 600 in accordance with aspects of the disclosed embodiments.

FIG. 6 illustrates a method 600 for the shadow edge detection process. This process is described and illustrated according to the assumption that a shadow exists on the plate. However, this method 600 can be performed on all plates that were initially given a low confidence as illustrated in FIG. 3, even though this low confidence may not be due to a shadow. As discussed in greater detail below, methods can be used to distinguish between plates with a shadow and plates without a shadow by extracting different features from the plate image. FIG. 7 illustrates a sample image with a shadow as the various image processing operations shown in FIG. 6 are performed to better illustrate the shadow edge identification process.

The input to a shadow detection algorithm can be a localized plate image. The vehicle image can be captured using a camera, such as camera 204, deployed to collect license plate images. A localized image is identified by processing the image by a computer system 100 so that features characteristic of a license plate, such as letters of the expected dimensions, are emphasized in a set of image processing steps An example of a localized plate image 705 is shown in FIG. 7. A localized plate image can contain the plate as well as additional structure of the car surrounding the plate.

The method 600 for shadow edge detection begins at block 605. At block 610, a tight plate bounding box can be identified. The identification of a tight plate bounding box is preferable in the exemplary embodiment because other structures from the car, such as brake lights and the bumper in frame 705, tend to degrade the ability to identify the shadow edge. The task of finding candidate license plate regions along with the associated tight plate bounding boxes is a function of the license plate localization process. In some embodiments, the location and size of the plate characters are identified to estimate the region of the entire plate. The localization algorithm is part of the standard XLPR workflow 425. A clipped tight bounding box 710 is shown in FIG. 7.

In some cases, the plate may be rotated slightly compared to the orientation of the camera. If this rotation is small, a slight amount of additional structure from the car may be included in the tight bounding box. If the area of this additional structure is much less than the area of the plate, then it has little impact on the shadow detection process. However, in some embodiments, the image may be needed to be rotated so that the plate code is oriented horizontally.

At block 615 the clipped image 710 is converted to a gray scale image 715. The purpose of this step is to create a single channel image where the plate characters are generally dark and the plate background is generally light. For certain dataset, where the dominant background of the plate is light, a red-green-blue (RGB) to grayscale conversion implemented as the rgb2gray function in Matlab, or other such conversion technique, may be sufficient. If the state code is known (another outcome of the XLPR process shown at 425), a customized conversion from the 3 channel color image to a monochrome gray image given a known background color may be used.

At block 620 of the shadow edge detection method 600, the characters and other fine structure from the image can be eliminated. In an example embodiment, this is accomplished utilizing an ordered statistic filter or other morphological filtering techniques.

An ordered statistic filter is a nonlinear image filter which is typically used to eliminate noise from images. The parameters of an ordered statistic filter can be set to give it the additional flexibility to remove fine structure from an image. The input to an ordered statistic filter is a mask M and a vector of weights $\alpha$. M is a binary array which is set to 1 if the pixel is considered to be in the neighborhood of the center pixel and 0 otherwise. One example of a mask is the 5 by 5 array illustrated in equation (1).

$$M = \begin{pmatrix} 0 & 1 & 1 & 1 & 0 \\ 1 & 1 & 1 & 1 & 1 \\ 1 & 1 & 1 & 1 & 1 \\ 1 & 1 & 1 & 1 & 1 \\ 0 & 1 & 1 & 1 & 0 \end{pmatrix} \quad (1)$$

The mask M can be swept over the image so that each pixel will be replaced by an operation on the pixels in its neighborhood. In an embodiment, this involves first labeling the pixels in the neighborhood of any given pixel by $X_i$, where i runs between 1 and N and N equals the number of ones in the mask M. $X_i$ can be sorted from the smallest element to the largest element and a function F(X) can be defined by equation (2).

$$F(X) = \sum_{i=1}^{N} \alpha_i X_i \quad (2)$$

If $\alpha_i=1/N$, then the ordered statistic filter becomes a mean filter, where each pixel is replaced with the mean of its neighborhood. If $\alpha_i=1$ for i=(N+1)/2 when N is odd and zero otherwise, then the ordered statistic filter becomes a median filter, where each pixel is replaced with the median of its neighborhood. In order to eliminate the dark characters in the plate embedded in the lighter background, we set $\alpha_i=1/m$ if i>N−m is chosen and zero otherwise, where m<<N. This will have the effect of replacing each pixel with the mean of the brightest few pixels in its neighborhood.

In order to erode the characters at block 620, the height and width of the mask should be slightly greater than the width of the characters in pixels. This ensures that a pixel in the center of the dark character will be replaced by light pixels just outside the character. If m is too small in the ordered statistic filter, then there will be contouring in the filtered image. Making m too large may not provide sufficient filtering. An optimal m can be chosen to optimize performance.

In an exemplary embodiment, a circular mask with a radius of 6 and m=4 gives images with good qualitative appearance. The resulting image after the application of the ordered statistic filter with such parameters is shown in frame 720. Frame 720 illustrates that although there are a number of artifacts caused by the brighter areas blooming, the image is dominated by the illumination and the fine structure has been eliminated.

At block 625, the image is binarized. A challenge in binarizing the image is choosing a threshold gray level where values below this level are set to 0 and values above this level are set to 1. Overall illumination may vary from plate to plate and from day to day so that the average gray level of the license plate in both the shadowed and unshadowed regions are different. Therefore, it is not possible to use a fixed threshold to binarize the images.

In an exemplary embodiment, the threshold is chosen so as to minimize the gray level variance of the pixels in what is chosen to be the background region and in what is chosen to be the foreground region. Such a choice for a threshold is known as Otsu's method. The result of such a binarization is illustrated in frame 725.

The next step is to identify the edges of the transition between the foreground region and the background region of the plate as shown at block 630. In edge detection applications where the edge can occur at any orientation, edge detection filters such as the Canny filter, the Sobel filter, or the Prewitt filter can be used. In applications where information about the shadow is known, it may be preferable to design a filter to detect only edges of certain orientations to minimize the detection of edges not related to the boundary of the shadow. For example, in certain applications, the shadows may always be above the unshaded areas of the plate although the position in the vertical direction may change. In these applications, it is only necessary to identify the regions of the image where a black pixel is above a white pixel, and not regions where a black pixel is below a white pixel or a black pixel is to the left or right of a white pixel.

An edge image is shown in frame 730. Note that the true edge of the shadow extends across the entire length of the image in frame 730. The two dark areas at the bottom of the plate rim are assigned to the background in frame 725. However, only a couple pixels are identified as edges because the primary pixel transitions have white above and black below, or white to the left or right of the black pixel.

For other tolling locations, the shadow area may not always be above the unshadowed area. For example, in some tolling location the dataset may contain a number of images where the shadow is on the right and the edge is oriented in the vertical direction. In general, however, based on the time of day, the season, and the orientation of the tolling location, the location of the sun and the direction of the cast shadow can be predicted. In an embodiment, an edge-detecting kernel can be employed to identify only shadow boundaries at the predicted orientation for the most accurate shadow edge detection.

The next step is to identify the longest edge in the image, as shown at block 635. Identifying the longest edge is necessary because empirically, the longest edge is likely the true shadow while the other edges are likely to be edges arising from structure in the plate that become part of the black pixels during binarization.

There are a number of different methods that can be employed for identifying the longest edge. In one embodiment, the image can be projected in the horizontal direction. In other words, for each row in the image of frame 730, the number of white pixels in each row is counted. A row that has a maximum number of white pixels can be identified. There will be some largest index row above the maximum row that has zero projected white pixels and some smallest index row below the maximum row that has zero projected white pixels. Only the white pixels in the section of the image bound between the largest index above row and the smallest index below row are kept. For the more general case, a projection parallel to the orientation of the shadow is performed.

The result of performing this operation is shown in frame 735. Note that the small sections at the bottom of the image are removed. In some cases, the shadow may intersect the top or the bottom of the clipped image. In these cases, the longest edge is bound only on a single side.

At block 640, a quadratic function can be fit to the edge profile in order to smooth its shape. Because the source of the shadow (the structure on the bumper) is smooth, the shadow is expected to be smooth. However, the statistic ordered filter, which is used to encode the characters, causes localized blooming and adds structure to the edge. This structure results in a boundary that doesn't exactly follow the edge of the shadow. Fitting a smooth function at block 640 improves the identification of the edge.

Also, the fitted edge must be translated in the vertical direction. Application of the statistic ordered filter erodes not only the characters, but also into the edge of the shadow. The erosion into the shadow will be approximately equal to the radius of the mask M. Therefore, the translated fitted edge will match the original position of the shadow. In the more general case, the shadow edge is translated perpendicular to the direction of the shadow boundary. The fitted line superimposed upon the license plate is shown in frame 740. The method for shadow edge detection ends at block 645.

Step 515 in FIG. 5 requires a determination of whether or not a shadow exists. The approach outlined in the method 600 of FIG. 6 does quite well when there is a well-defined shadow on the plate. However, for the many dataset, a shadow occurs for only a small percent of the images. When the method 600 is applied to a plate that is not in shadow, the method may still return a boundary line. For example, the method 600 may continue to process the image and find some structure due to illumination differences, background structure, or just noise, which may be identified as a shadow boundary.

Figure 8:
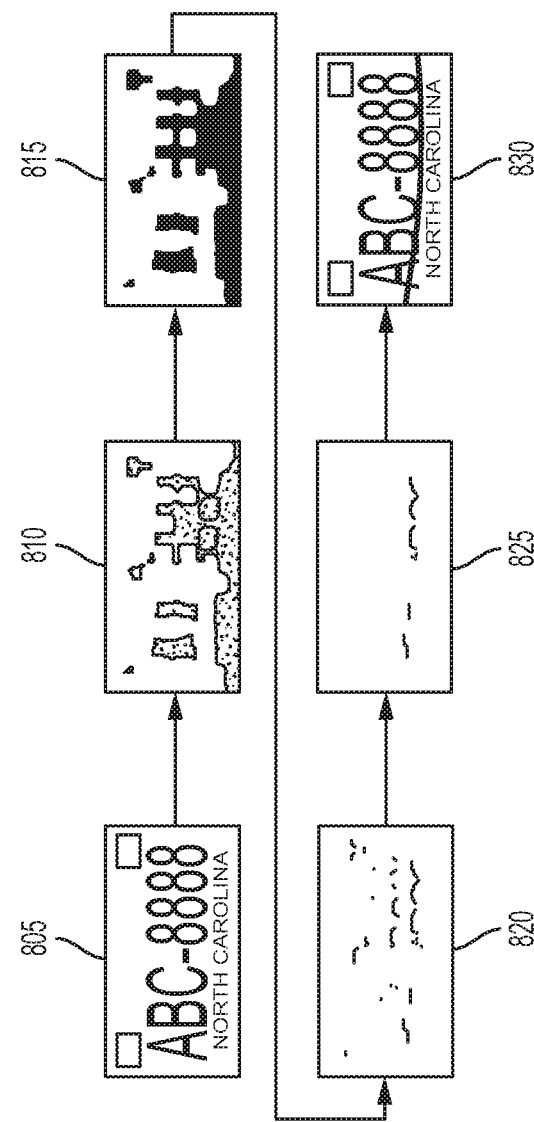
FIG. 8 depicts an exemplary implementation of the method 600 on a license plate without a shadow in accordance with aspects of the disclosed embodiments.

An example of this phenomenon is shown in FIG. 8, which illustrates the resulting flow of method 600 on a license plate without a shadow. Frame 805 and frame 810 shows that the method 600 does quite well in eroding the plate characters and other fine structure on the plate. However, the binarization step 625, shown on a license plate without a shadow in frame 815, identifies variations in illumination across the plate and artifacts produced by the erosion step as background and foreground regions. When the edge detection step 630 takes place, as shown by frame 820, the edges have nothing to do with any illumination boundary and are randomly distributed across the plate. The algorithm for picking a longest extended edge will indeed identify a region of unconnected edges that are at approximately the same vertical position as the longest edge as shown at frame 825, and a quadratic fit can be performed as shown in frame 830.

The resulting boundary has nothing to do to the presence of a shadow. As noted, no shadow was present in the original image. Thus, in some cases, relighting the upper region of the plate, assuming that a shadow is present when it is not, may introduce artifacts that degrade the performance of OCR and character segmentation. Additionally, given that most plates do not have shadows, applying the shadow removal algorithm to all plates can degrade performance of real time system. Accordingly, in an embodiment, steps can be taken to identify if a shadow is cast on the plate.

In order to identify whether a shadow is present, features derived from the shadow edge detection method 600 can be extracted. The values of the features are different for plates that have shadows cast on them compared to plates that do not have cast shadows. It should be understood that individually, each feature is a weak classifier and cannot alone robustly identify the presence of a shadow. Thus, in an embodiment, a combination of the features can be used to provide a more robust shadow classifier.

In an exemplary embodiment, five features and their distributions for plate and no plate regions may be used as the robust shadow classifier. It should be understood that alternative combinations of the features, the individual features, and other features may also be used depending on design considerations.

Figure 9:
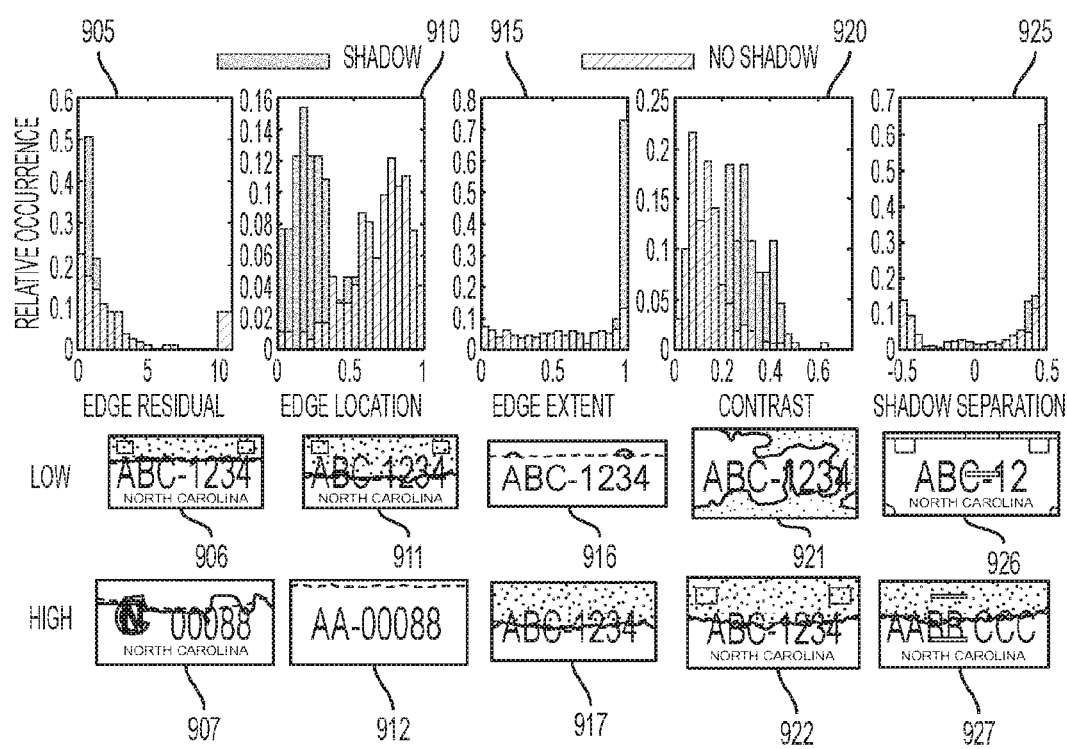
FIG. 9 depicts an exemplary chart illustrating features associated with the determination of the existence of a shadow in accordance with aspects of the disclosed embodiments.

FIG. 9 illustrates data taken from 65 plates in an exemplary dataset, which were identified to have shadows and 192 plates in the same dataset that were identified to not have shadows. Below the plotted data is an exemplary plate from the data set. The magnitude of the metric defines the X-axis and the relative occurrence within the data is set as the Y-axis. Both shadow and non-shadow results are plotted on the each graph to illustrate the efficacy of the metric at separating the two classes.

The first feature shown in plot 905 is the edge residual. The edge residual is defined as the residual difference between the longest edge identified in step 635 of the shadow edge detection method 600 and the quadratic fit to the edge found is step 640.

In both frame 906 and frame 907, the longest edge is shown as the complete line and the quadratic fit is shown as the dotted line. For true shadow boundaries, the edge is typically smooth, fit well by the quadratic, and the edge residual will be quite small, as illustrated in frame 906. However, when there is no shadow boundary as in frame 907, the longest edge will either follow the structure on the plate or the noise introduced in the erosion process. This edge typically will not be fit well by a quadratic and the edge residual will be large. The distribution shown in plot 905 illustrates that true shadow boundaries tend to have small edge residuals. Although there are a few plates without shadows that have small edge residuals, a large number of them can have quite large edge residuals.

Plot 910 shows the distribution of the average vertical position of the edge location. This feature is called the edge location. It is defined as the normalized absolute distance of the average vertical position of the edge from the center of the image. For example, if the edge is located in the center of the image, then this feature is defined to be zero, while if the edge is located at the top or the bottom, it is defined to be 1. True shadows are more typically closer to the center of the plate, while the false shadow edges detected for plates without shadows are more commonly at the top or the bottom of the plate because they are responding to dark structures which are usually near the top or the bottom of the plate. An example of a shadow near the center of the plate is shown in frame 911 and a false shadow near the top of the plate is also shown in frame 912.

Plot 915 illustrates a feature known as edge extent. For horizontal edges, edge extent can be defined as the fraction of columns in the image that can contain an edge pixel. Edge extent is indicative of whether the shadow edge runs fully across the plate. If the shadow edge runs contiguously from the left edge of the plate to the right edge of the plate, then the edge extent feature is defined to be 1. True shadows for the dataset usually run across most of the plate, so the histogram 915 of the edge extent feature is predominantly near 1. When false shadows are detected, often small sections of the plate are detected as the false shadow edge and the distribution of this metric is more uniformly distributed between zero and 1. A true shadow edge which has an extent of 1 is shown in frame 917. The plate in frame 916 has two small sections detected as an edge. Frame 916 shows a plate with edge extent 0.

Plot 920 illustrates the fourth feature, which is the contrast between the background and the foreground region. To get the contrast, the mean of the gray levels of all the pixels in the white region minus the mean of the gray level of all the pixels in the black region can be taken and divided by 255. True shadows are generally correctly identified by Otsu's threshold for binarization, usually have a larger contrast than when there is no shadow, and illumination variations are the source of the binarization. This trend is evident in the histogram 920. In the frame 921 and frame 922 below the histogram 920, the pixels chosen as background and foreground pixels are shaded. The pixels in frame 921 do not cover regions of the plate with significantly different intensity leading to a low contrast. However, the pixels in frame 922 correctly are assigned to shadow and no shadow regions, which lead to a high contrast.

Finally, plot 925 illustrates the last feature, which is shadow separation. Shadow separation is defined as the vertical separation of the center of mass of the pixels in the shadow region and the pixels in the non-shadow region divided by the number of rows in the clipped plate image. The largest the vertical separation can be is 0.5, which occurs when the shadow edge is horizontal. Because the shadow always lies above the unshaded area, the shadow separation is usually near 0.5. If there is no shadow, then the plate will arbitrarily be divided into a background and foreground region. What is chosen as a "shadow" may even lie below the "unshaded" area so the shadow separation can even take on negative values. This can be observed in the distribution where the shadow separation is more uniformly distributed. Frame 926 and frame 927 illustrate this feature.

The values of the 5 features for each plate form a point in a 5-dimensional feature space. Logistic regression can be used to identify a decision boundary between the points corresponding to a plate shadow and the points corresponding to a plate with no shadow, although other classification techniques may be used. Applying such a logistic regression thus provides an indication of the presence or absence of a shadow. A classifier may be trained with a set of manually labeled images taken during the setup of a license plate detection facility. Once a classifier has been trained and the parameters determined, they may be used in the operation of the detection in step 515. Specifically, the 5 features are determined for each plate and the parameters of the classifier will indicate if the plate has a shadow or not. In an embodiment, leave one out cross validation can be performed which can be used to produce a confusion matrix. By using the combined features defined above to classify the presence or absence of shadows, empirical evidence suggests an accuracy of 97%.

Figure 10:
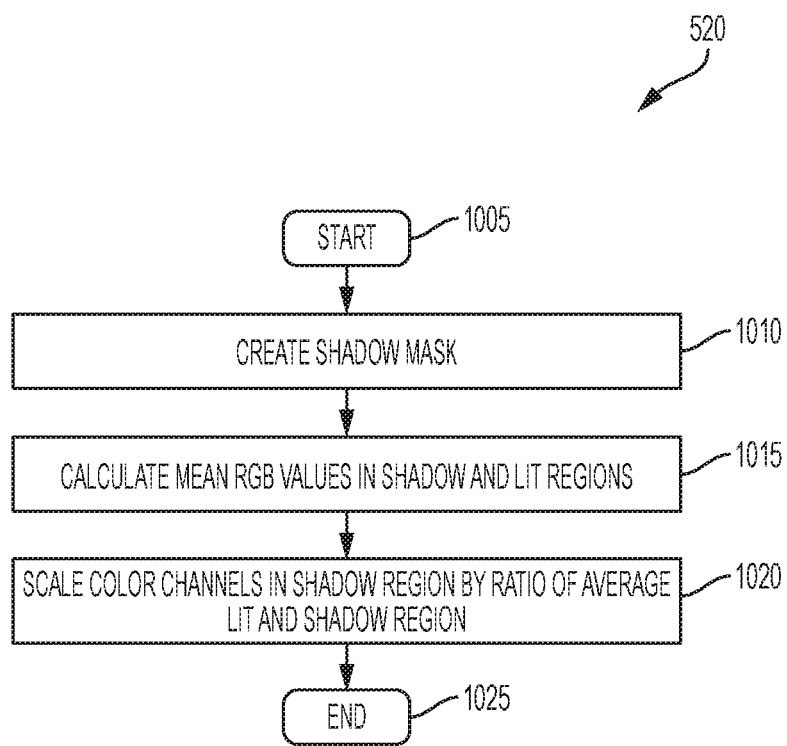
FIG. 10 depicts a flow chart illustrating logical operational steps associated with a method for relighting a shaded region of a license plate in accordance with disclosed embodiments.

False structures introduced during binarization of an image with a shadow can cause OCR to give incorrect results. These errors can be reduced if the shadow region of the plate is brightened to have the same intensity as the region without the shadow. The shadow relighting described at step 520 of FIG. 5 includes a number of steps as illustrated in the method shown in FIG. 10. The method begins at step 1005. It should be noted that the goal of step 520 is not to produce an image that appears not to have a shadow, but instead produce an image that reduces the errors in OCR.

At step 1010, the shadow relighting method begins by creating a shadow mask from the detected shadow edge. For a horizontal shadow boundary, all pixels above the shadow edge are assumed to be in shade, while all pixels below the shadow edge are assumed to be unshaded. For more general shadow orientations, the shadow defines a boundary where all pixels on one side of the boundary are assumed to be shaded and those on the other side are assumed to be in the light. A mask can be assigned to the pixels determined to be in the shaded region.

The process continues to step 1015 where the mean values of the red, green, and blue channels are separately calculated for the shadow region and for the lit region. Specifically, the calculation can be performed according to equation (3) as follows:

$$\overline{R}_s = \frac{1}{|S|}\sum_{i \in S} r_i, \ \overline{G}_s = \frac{1}{|S|}\sum_{i \in S} g_i, \ \overline{B}_s = \frac{1}{|S|}\sum_{i \in S} b_i, \quad (3)$$

$$\overline{R}_L = \frac{1}{|S|}\sum_{i \in L} r_i, \ \overline{G}_L = \frac{1}{|S|}\sum_{i \in L} g_i, \ \overline{B}_L = \frac{1}{|S|}\sum_{i \in L} b_i,$$

where S is the set of pixels in the shadow mask and L is the set of pixels in the unshaded area. At step 1020, the image is relit by multiplying each pixel in each color channel of the shaded area by the ratio of the average of the lit area to the average of the shaded area. The unshaded pixels remain unchanged. In other words, a new image is generated according to equation (4) as follows:

$$r_i' = \begin{cases} i \in S: R_L r_i/R_s \\ i \in L: r_i \end{cases}, g_i' = \begin{cases} i \in S: G_L g_i/G_s \\ i \in L: g_i \end{cases}, \quad (4)$$

$$b_i' = \begin{cases} i \in S: B_L b_i/B_s \\ i \in L: b_i \end{cases}$$

where ($r_i'$, $g_i'$, $b_i'$) is the color pixel value in the relit image. It should be understood that other known methods of relighting shaded regions may equivalently be applied to the masked region. The method ends at step 1025.

Experimental results for automatic shadow edge detection and relighting according to the methods and systems disclosed herein show that for most plates, the shaded region is lightened and the overall intensity becomes closer to that of the unshaded region.

The methods and systems disclosed herein address the growing issue of shadows and the problems they create for ALPR, and ORT in particular, in a manner not previously known. The embodiments help reduce the number of images currently being sent for manual review, in turn saving review costs and making the business more profitable.

Further, the embodiments have been empirically shown to provide shadow identification performance of 97%. The shadow correction\relighting methods and systems convert most plates that have shadows to high confidence results.

Based on the foregoing, it can be appreciated that a number of embodiments, preferred and alternative, are disclosed herein. For example, in one embodiment, a method for license plate shadow detection and relighting comprises collecting an image of a license plate, identifying a potentially shaded region of said license plate, determining if said shaded region is actually shaded, and relighting said actually shaded region.

In an embodiment, identifying a potentially shaded region of said license plate further comprises fitting a tight bound box around said license plate in said image of said license plate, removing fine structures from said image of said license plate, binarizing said image of said license plate, identifying edges in said image of said license plate, selecting a longest edge from said identified edges in said image of said license plate as an edge defining a boundary between said shaded region of said license plate and an un-shaded region of said license plate, and translating said longest edge.

In an embodiment, fine structures are removed with an ordered statistic filter. In another embodiment, identifying edges in said image of said license plate further comprises identifying edges primarily oriented in an expected direction of a shadow boundary. In an embodiment, the expected direction of said shadow boundary is determined according to a relative orientation of a vehicle with said license plate and an expected position of the sun according to a geolocation on the earth and a time of day.

In yet another embodiment, determining if said shaded region is actually shaded further comprises extracting at least two features from said image of said license plate, combining said at least two features, and classifying said combined at least two features using a pre-trained shadow classifier in order to determine if a shadow is present in said image of said license plate.

In an embodiment, relighting said actually shaded region further comprises creating a shadow mask and applying a relighting application to said shadow masked region. The relighting application comprises calculating a mean RGB value for said shadow masked region, calculating a mean RGB value for an unmasked region, and scaling pixels in said shadow masked region according to the ratio of said mean RGB value for said shadow masked region and said mean RGB value of said unmasked region.

In yet another embodiment, a system for license plate shadow detection and relighting comprises a video acquisition module configured to collect image data of a license plate; a processor; and a computer-usable medium embodying computer code, said computer-usable medium being coupled to said processor, said computer code comprising non-transitory instruction media executable by said processor configured for: identifying a shaded region of said license plate, determining if said shaded region is actually shaded, and relighting said actually shaded region.

In an embodiment, identifying a shaded region of said license plate further comprises fitting a tight bound box around said license plate in said image of said license plate, removing fine structures from said image of said license plate, binarizing said image of said license plate, identifying edges in said image of said license plate, selecting a longest edge from said identified edges in said image of said license plate as an edge defining a boundary between said shaded region of said license plate and an unshaded region of said license plate, and translating said longest edge.

In another embodiment, the system further comprises an order static filter for removing said fine structures.

In an embodiment, identifying edges in said image of said license plate further comprises identifying edges primarily oriented in an expected direction of a shadow boundary. The expected direction of said shadow boundary is determined according to a relative orientation of a vehicle with said license plate and an expected position of the sun according to a geolocation on the earth and a time of day.

In another embodiment, determining if said shaded region is actually shaded further comprises extracting at least two features from said image of said license plate, combining said at least two features, and evaluating said combined at least two features using a shadow classifier in order to determine if a shadow is present in said image of said license plate.

In an embodiment, relighting said actually shaded region further comprises creating a shadow mask and applying a relighting application to said shadow masked region. The relighting application comprises calculating a mean RGB value for said shadow masked region, calculating a mean RGB value for an unmasked region, and scaling pixels in said shadow masked region according to the ratio of said mean RGB value for said shadow masked region and said mean RGB value of said unmasked region.

In yet another embodiment, a method for license plate recognition comprising collecting an image of a license plate; performing license plate recognition on said image of said license plate; calculating a confidence metric for said license plate recognition; and performing a shadow detection and relighting comprising: identifying a shaded region of said license plate, determining if said shaded region is actually shaded, relighting said actually shaded region, and performing a second license plate recognition on said image of said license plate if said confidence metric is below a predetermined threshold.

In an embodiment, identifying a shaded region of said license plate further comprises fitting a tight bound box around said license plate in said image of said license plate, converting said image of said license plate to black and white, removing structures from said image of said license plate, binarizing said image of said license plate, identifying edges in said image of said license plate, selecting a longest edge from said identified edges in said image of said license plate as an edge defining a boundary between said shaded region of said license plate and an unshaded region of said license plate, smoothing said selected longest edge from said identified edges in said image of said license plate, and translating said smoothed longest edge.

In an embodiment, determining if said shaded region is actually shaded further comprises extracting at least two features from said image of said license plate combining said at least two features, and evaluating said combined at least two features using a shadow classifier in order to determine if a shadow is present in said image of said license plate.

In another embodiment, relighting said actually shaded region further comprises creating a shadow mask and applying a relighting application to said shadow masked region.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A method for license plate image shadow detection and relighting comprising:
   collecting an image of a license plate with an image capturing device;
   identifying a candidate region of interest containing said license plate;
   identifying a potentially shaded region of said license plate by identifying a boundary between said potentially shaded region and an unshaded region;
   determining if said shaded region is actually shaded; and
   relighting said actually shaded region.

2. The method of claim 1 wherein identifying a potentially shaded region of said license plate further comprises:
   fitting a tight bound box around said license plate in said image of said license plate;
   removing fine structures from said image of said license plate;
   binarizing said image of said license plate;
   identifying edges in said image of said license plate;
   selecting a longest edge from said identified edges in said image of said license plate as an edge defining a boundary between said shaded region of said license plate and an unshaded region of said license plate; and
   translating said longest edge.

3. The method of claim 2 wherein said fine structures are removed with an ordered statistic filter.

4. The method of claim 2 wherein identifying edges in said image of said license plate further comprises:
   identifying edges primarily oriented in an expected direction of a shadow boundary.

5. The method of claim 4 wherein said expected direction of said shadow boundary is determined according to a relative orientation of a vehicle with said license plate and an expected position of the sun according to a geolocation on the earth and a time of day.

6. The method of claim 1 wherein determining if said shaded region is actually shaded further comprises:
   extracting at least two features from said image of said license plate;
   combining said at least two features; and
   classifying said combined at least two features using a pre-trained shadow classifier in order to determine if a shadow is present in said image of said license plate.

7. The method of claim 1 wherein relighting said actually shaded region further comprises:
   creating a shadow mask; and
   applying a relighting application to said shadow masked region.

8. The method of claim 7 wherein said relighting application comprises:
   calculating a mean RGB value for said shadow masked region;
   calculating a mean RGB value for an unmasked region; and
   scaling pixels in said shadow masked region according to the ratio of said mean RGB value for said shadow masked region and said mean RGB value of said unmasked region.

9. A system for license plate image shadow detection and relighting comprising:
   a video acquisition module configured to collect image data of a license plate;
   a processor; and
   a computer-usable medium embodying computer code, said computer-usable medium being coupled to said processor, said computer code comprising non-transitory instruction media executable by said processor configured for:
   identifying a candidate region of interest containing said license plate;
   identifying a potentially shaded region of said license plate by identifying a boundary between said potentially shaded region and an unshaded region in said candidate region of interest containing said license plate;
   determining if said shaded region is actually shaded; and
   relighting said actually shaded region.

10. The system of claim 9 wherein identifying a potentially shaded region of said license plate further comprises:
    fitting a tight bound box around said license plate in said image of said license plate;
    removing fine structures from said image of said license plate;
    binarizing said image of said license plate;
    identifying edges in said image of said license plate;
    selecting a longest edge from said identified edges in said image of said license plate as an edge defining a boundary between said shaded region of said license plate and an unshaded region of said license plate; and
    translating said longest edge.

11. The system of claim 10 further comprising an order static filter for removing said fine structures.

12. The system of claim 10 wherein identifying edges in said image of said license plate further comprises:
    identifying edges primarily oriented in an expected direction of a shadow boundary.

13. The system of claim 12 wherein said expected direction of said shadow boundary is determined according to a relative orientation of a vehicle with said license plate and an expected position of the sun according to a geolocation on the earth and a time of day.

14. The system of claim 9 wherein determining if said shaded region is actually shaded further comprises:
    extracting at least two features from said image of said license plate;
    combining said at least two features; and classifying said combined at least two features using a pre-trained shadow classifier in order to determine if a shadow is present in said image of said license plate.

15. The system of claim 9 wherein relighting said actually shaded region further comprises:
   creating a shadow mask; and
   applying a relighting application to said shadow masked region.

16. The system of claim 15 wherein said relighting application comprises:
   calculating a mean RGB value for said shadow masked region;
   calculating a mean RGB value for an unmasked region; and
   scaling pixels in said shadow masked region according to the ratio of said mean RGB value for said shadow masked region and said mean RGB value of said unmasked region.

17. A method for license plate image recognition comprising:
   collecting an image of a license plate with an image capturing device;
   performing license plate recognition on said image of said license plate;
   calculating a confidence metric for said license plate recognition; and
   performing a shadow detection and relighting comprising:
      identifying a candidate region of interest containing said license plate;
      identifying a potentially shaded region of said license plate by identifying a boundary between said potentially shaded region and an unshaded region;
      determining if said shaded region is actually shaded;
      relighting said actually shaded region; and
      performing a second license plate recognition on said image of said license plate if said confidence metric is below a predetermined threshold.

18. The method of claim 17 wherein identifying a potentially shaded region of said license plate further comprises:
   fitting a tight bound box around said license plate in said image of said license plate;
   converting said image of said license plate to black and white;
   removing structures from said image of said license plate;
   binarizing said image of said license plate;
   identifying edges in said image of said license plate;
   selecting a longest edge from said identified edges in said image of said license plate as an edge defining a boundary between said shaded region of said license plate and an unshaded region of said license plate;
   smoothing said selected longest edge from said identified edges in said image of said license plate; and
   translating said smoothed longest edge.

19. The method of claim 17 wherein determining if said shaded region is actually shaded further comprises:
   extracting at least two features from said image of said license plate;
   combining said at least two features; and
   classifying said combined at least two features using a pre-trained shadow classifier in order to determine if a shadow is present in said image of said license plate.

20. The method of claim 17 wherein relighting said actually shaded region further comprises:
   creating a shadow mask; and
   applying a relighting application to said shadow masked region.

* * * * *